Nov. 24, 1925.
A. CHERLANCHAKEVICH
1,562,493
AUTOMATIC RODENT TRAP
Filed Nov. 10, 1921    4 Sheets-Sheet 1
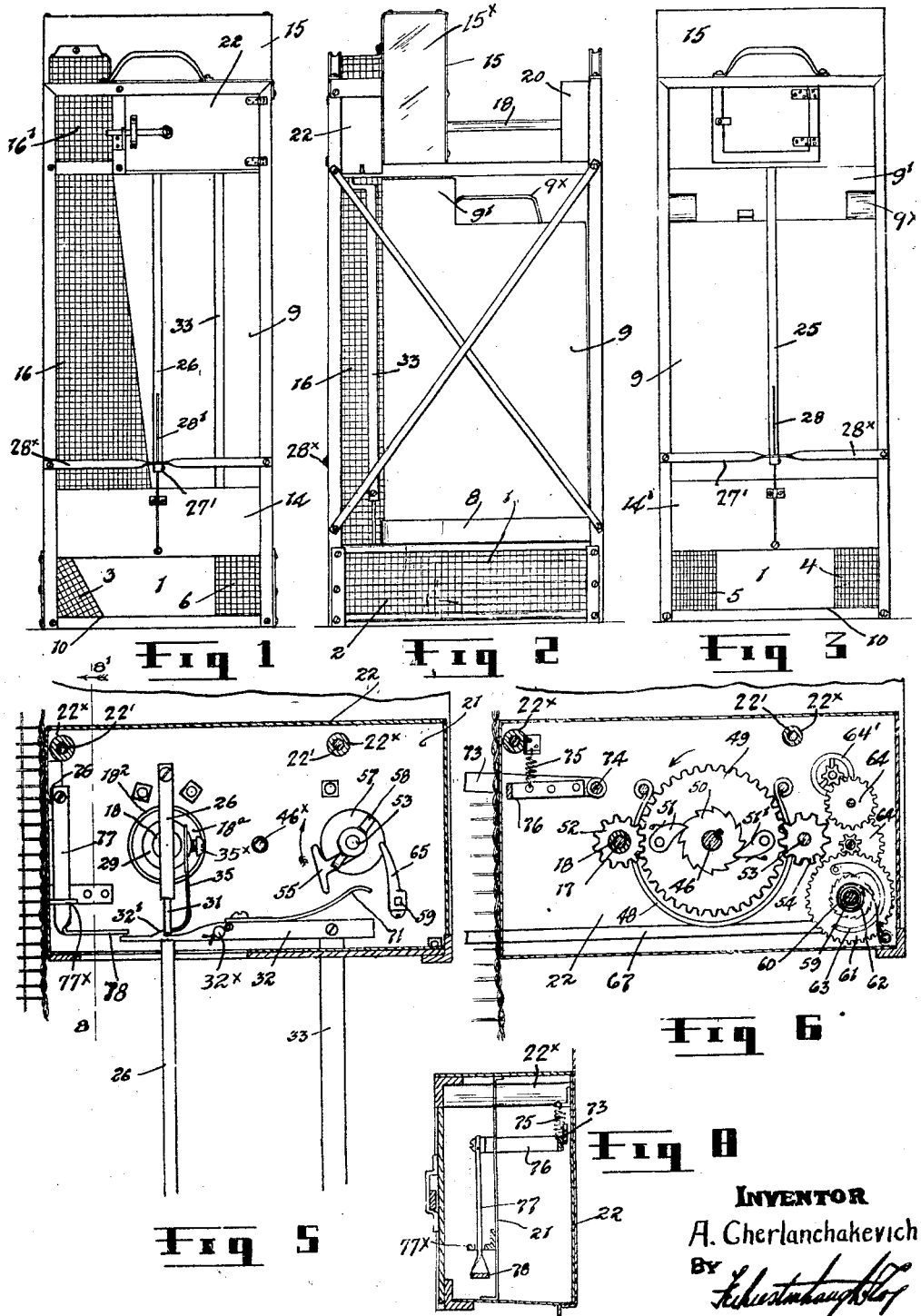
INVENTOR
A. Cherlanchakevich
BY
ATTYS

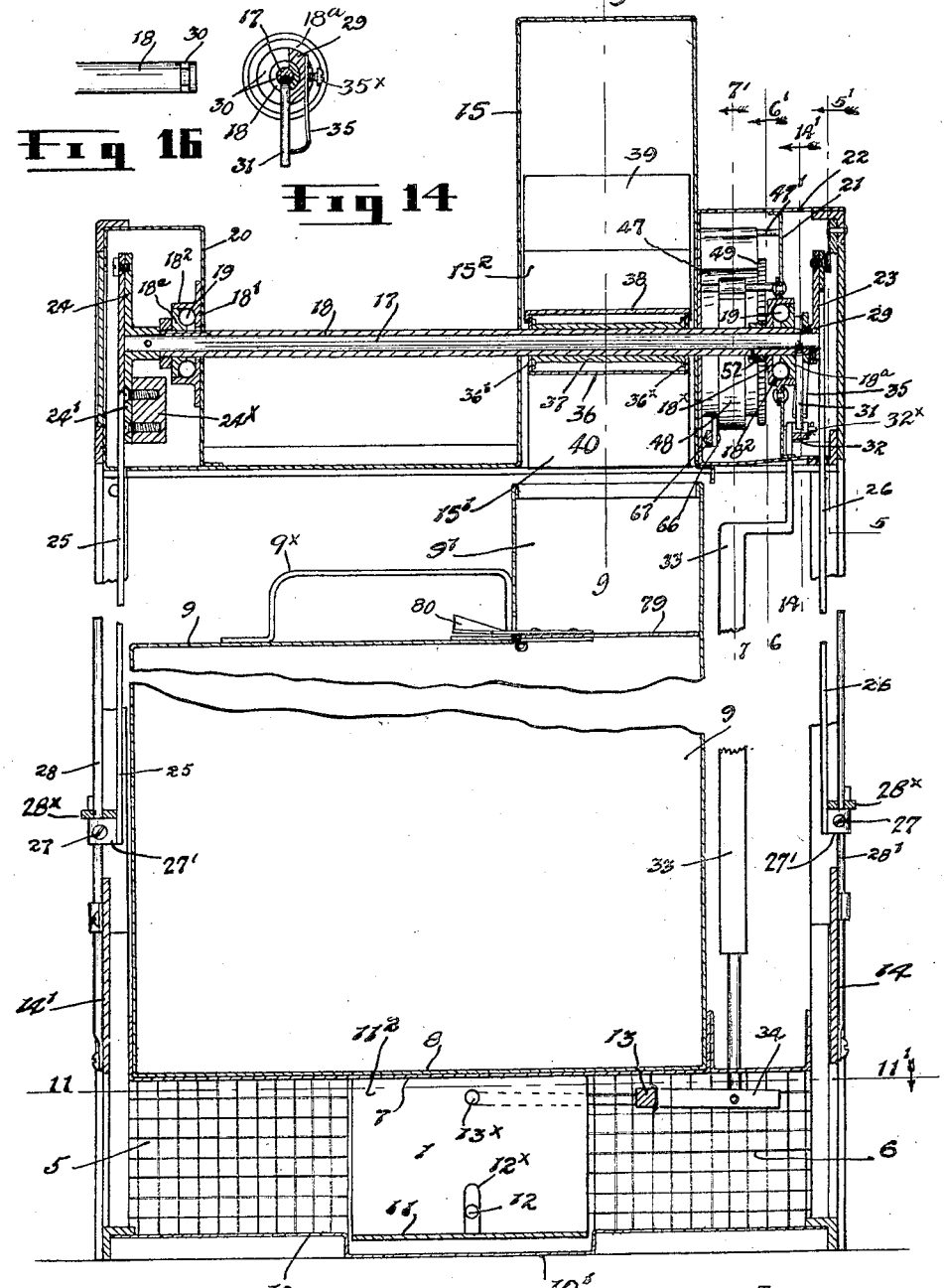

Nov. 24, 1925                                            1,562,493
                         A. CHERLANCHAKEVICH
                         AUTOMATIC RODENT TRAP
                   Filed Nov. 10, 1921      4 Sheets-Sheet 3

INVENTOR
A. Cherlanchakevich
By
ATTYS

Nov. 24, 1925.  1,562,493

A. CHERLANCHAKEVICH

AUTOMATIC RODENT TRAP

Filed Nov. 10, 1921   4 Sheets-Sheet 4

INVENTOR
A. Cherlanchakevich
By
ATTYS

Patented Nov. 24, 1925.

1,562,493

UNITED STATES PATENT OFFICE.

ANDREW CHERLANCHAKEVICH, OF WINNIPEG, MANITOBA, CANADA.

AUTOMATIC RODENT TRAP.

Application filed November 10, 1921. Serial No. 514,334.

*To all whom it may concern:*

Be it known that I, ANDREW CHERLANCHAKEVICH, of the city of Winnipeg, in the Province of Manitoba, Canada, have invented certain new and useful Improvements in Automatic Rodent Traps, of which the following is the specification.

The invention relates to improvements in automatic rodent traps particularly constructed for catching mice, rats, gophers and such like animals and an object of the invention is to provide a trap which is entirely automatic in its operation, that is to say a trap which will catch the animal, reset itself for a further animal and has capacity for a considerable number of animals, and is further arranged so that the caught animal can be exterminated in the trap and entirely out of view of any animal approaching or entered in the trapping compartment.

A further object of the invention is to construct the trap so that there is absolutely no possibility of the animal getting out once the trap gates are closed.

A still further object is to arrange the trap such that if more than one animal gets into the trap they can both be kept therein till both are exterminated.

A further object of the invention is to construct the trap in a durable and economical manner and so that it can be readily manufactured and can be relied upon to do the work for which it is designed.

A further object is to construct the trap so that the caught animals can be readily removed therefrom from time to time without disturbing the other working parts of the appliance.

With the above more important and other minor objects in view which will become more apparent as the description proceeds, the invention consists essentially in the arrangement and construction of parts hereinafter more particularly described and later pointed out in the appended claims, reference being had to the accompanying drawings in which:—

Fig. 1 is a front view of the trap with the gates open.

Fig. 2 is a side view of the trap.

Fig. 3 is a rear view of the trap.

Fig. 4 is an enlarged detailed vertical sectional view centrally through the trap, the central portion being broken away.

Fig. 5 is a vertical sectional view at 5—5' Fig. 4 and looking inwardly.

Fig. 6 is a vertical sectional view at 6—6' Fig. 4 and looking inwardly.

Fig. 8 is a vertical sectional view at 8—8' Fig. 5 and looking to the left.

Fig. 14 is a vertical sectional view at 14—14' Fig. 4 and looking inwardly.

Fig. 16 is a detailed view showing one end of the tubular shaft.

In the drawings like characters of reference indicate corresponding parts in the several figures.

Figure 7:
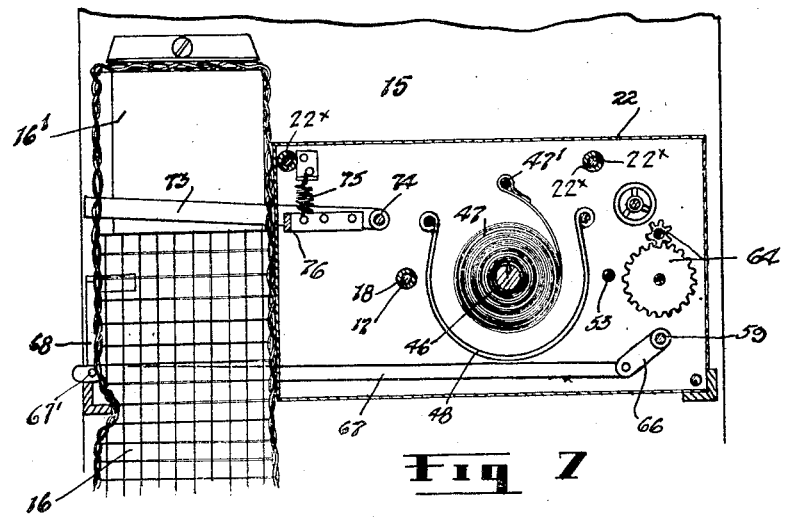
Fig. 7 is a vertical sectional view at 7—7' Fig. 4 and looking inwardly.

As the trap embodies a considerable number of parts I have considered it advisable to initially give a short outline of the way in which an animal is caught by the trap as with this explained it will be more easy to follow the description of the details.

At the bottom of the trap there is what might be termed an entrance or trapping compartment which is suitably baited to entice the animal and is provided with automatically controlled gates which close after the animal has entered and thereby traps the animal. After entering the animal is allowed to climb through an exposed escape passage to an elevated discharging compartment having a trap door therein which turns over under the weight of the animal and discharges the animal into an exterminating compartment in the form of a box containing suitable material such as water or coal oil for drowning the animal. Each time the animal is discharged into the exterminating compartment the gates are automatically reset. The working parts are energized by a spring which is wound up from time to time as occasion requires and once wound up the trap will operate for a considerable time, catching and exterminating the animals and resetting itself so that it is entirely automatic other than when winding is required.

Figure 11:
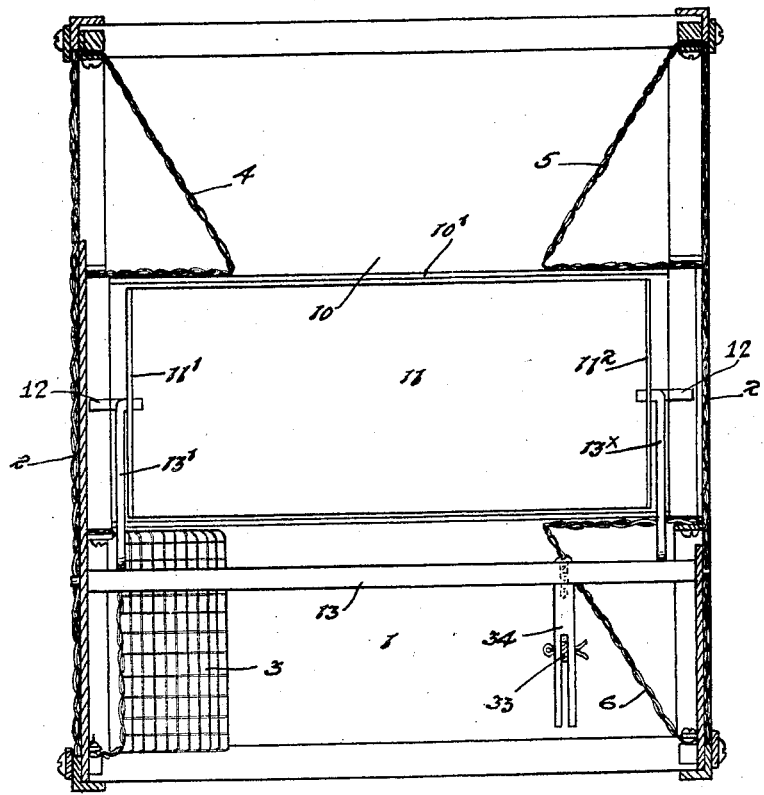
Fig. 11 is a horizontal sectional view at 11—11' Fig. 4 and looking downwardly.
Figure 12:
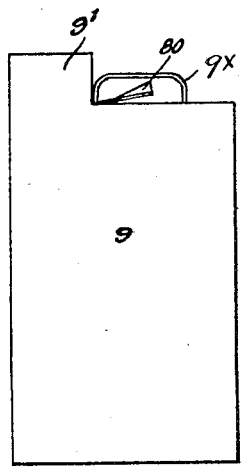
Fig. 12 is a side view of the exterminating box.
Figure 13:
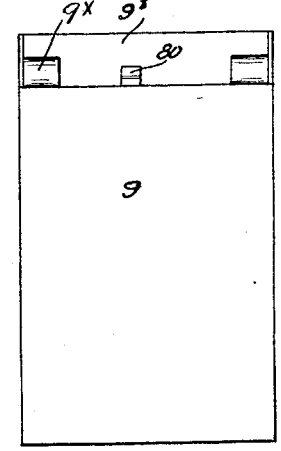
Fig. 13 is an end view of the exterminating box.
Figure 17:
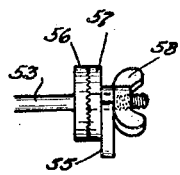
Fig. 17 is an enlarged detailed side view of the adjusting discs for the timing mechanism.

Referring now to the drawings;

1 is the entrance or trapping compartment which is provided with open front and rear ends and has the sides closed by suitable heavy screens 2 and is provided with bait receptacles 3, 4, 5 and 6. The ends of the screens are slidably guided (see Fig. 11) so that they can be raised to allow the bait to be placed in the bait receptacles or cages. The top of the entrance compartment is closed by a permanent cross plate 7 which receives and supports the bottom 8 of the exterminating compartment or box 9 which is provided with handles 9ˣ. The bottom of the compartment 1 is also closed by a plate 10 which is bent centrally to provide a wide transversely extending channel 10'.

11 is a false bottom or pressure plate extending the length of the channel and having upturned ends 11' and 11², the ends being vertically slotted as indicated at 12ˣ to receive guide pins 12 extending inwardly from the sides of the compartment and preventing lateral swinging of the plate. 13 is a cross shaft located in the upper part of the entrance compartment and having the ends thereof rotatably mounted in the sides of the same. This shaft is supplied with a pair of extending lifting arms 13' and 13ˣ which have their extremities pivotally attached to the upturned ends of the pressure plate, thereby supporting the same and effecting a turning movement in the shaft 13 upon the pressure plate being pressed downwardly.

The open ends of the entrance compartment allow of the entrance of the animal which is enticed to the compartment by the bait and vertically sliding gates 14 and 14' are provided to close the said open ends after the animal has entered, the gates being normally open and being released to close in a manner later described by the animal treading on the pressure plate and depressing the same.

An open frame like structure extends upwardly from the entrance compartment and forms a support for a discharging compartment 15 positioned above the exterminating compartment 9. The discharging compartment sits transversely of the trap and has an open bottom 15' (see Fig. 4) and is adapted to discharge into an upwardly extending open ended neck like extension 9' formed as part of the compartment 9 and serving to pass the animal discharged from the compartment 15 directly into the compartment 9. The left hand end of the discharging compartment is closed by a permanent plate 15² whilst the other end is closed by a transparent plate 15ˣ say of glass, mica or other such transparent material, the arrangement being such that the animal is naturally enticed to the lighted end of the discharge compartment. The darker or left hand end of the discharging compartment is provided with a side opening 16' and between the opening 16' and the top of the entrance compartment I provide an escape passage 16 which in the present instance is formed from screen wire, the arrangement being such that the animal caught in the entrance compartment can climb up through the escape passage and enter the discharge compartment through the opening 16'.

17 is a main shaft passing more or less centrally across the discharging compartment and extending practically the full width of the trap. This shaft is rotatably received within a tubular shaft 18, the tubular shaft having the rear end carried in a suitable bearing 18' and the forward end carried in a suitable bearing 18ˣ. The bearings in the present instance are shown as ball bearings, each presenting runways 18², cones 18ᵃ and balls 19 between the cones and runways. The rear runway is secured to a stationary box like housing 20 formed as part of the upper structure and the front runway is permanently secured to a partition 21 dividing what might be termed a mechanism box 22 situated at the front of the discharging box 15.

It will be observed that the ends of the shaft 17 project beyond the ends of the tubular shaft and that the said projecting ends are fitted with front and rear cranks 23 and 24 extending normally upwardly and connected pivotally at their free ends to downwardly extending operating bars 25 and 26 located at the rear and front of the trap and having their lower ends provided with outstanding collars 27' adjustably connected by adjusting screws 27 to the gate supporting rods 28 and 28'. The gate supporting rods have their upper ends passing slidably through horizontally disposed guide bars 28ˣ, the ends of which are secured to the ends of the exterminating compartment 9. By providing the adjusting screws I can properly set the gates so that they will be fully open when the cranks are up. The rear crank 24 is supplied with an extension arm 24' which carries a weight 24ˣ located at the opposite side of the shaft to the crank, said weight aiding in resetting the cranks after they have been turned to their down position.

The cone of the front bearing 18ˣ is secured permanently to the tubular shaft 18 and is provided with a forwardly extending boss 29 positioned between the cone and the crank and terminating at the front end of the tubular shaft.

The sleeve and boss are both cut to provide a guide slot 30 for a pin 31 extending in the opposite direction to the crank 23 and having the inner end permanently secured to the shaft 17. This slot passes from the top side of the shaft to the bottom so that the said pin can turn freely with the shaft and without moving the sleeve or boss approximately half a revolution and after having turned this half revolution will carry the sleeve and boss around with it.

In the lower part of the box 22 and to the front side of the partition 21 I locate a horizontally disposed rocker arm 32 pivotally mounted on a pin 32× extending from the partition 21 and having the one end pivotally connected to a vertically disposed operating bar 33, the lower end of which is pivotally attached to a lever arm 34 extending forwardly from the shaft 13. The other end of the rocker arm is supplied with a catch 32′ engageable with the outer end of the pin 31 and adapted to stop the said pin against rotation in a clockwise direction and with the cranks up. A spring 35 is secured to the boss 29 by a jam screw 35× as it extends downwardly and has the lower end bent to the side and engaging the pin and adapted to give the stop pin an initial kick to the left as soon as the stop pin is released from the catch of the rocker arm.

The release of the pin is effected by the animal stepping on the pressure plate which acts through the connections to shift the bar 33 upwardly and thereby force down the catch end of the rocker arm. The instant this occurs the spring 35 kicks the pin to the left and throws the cranks 23 and 24 past their dead central position after which time the weight of the gates causes the cranks to swing down and the gates to close.

I might here state that this is the initial operation as once the gates have closed the animal is entrapped in the lower compartment, the gates remaining closed until the said animal has climbed up through the escape passage into the discharging compartment and has set off by his weight a revolving door which plunges him into the exterminating compartment.

Within the compartment 15 and on the tubular shaft 18 I mount a trap door 36 which is provided with side flanges 36′ and 36× and an end flange 36² and is fitted between the flanges 36′ and 36× with a fixed tube 37 mounted on the tubular shaft and fastened to the same by adjusting screws 37′.

The trap door carries a release door 38 which is pivotally secured by a cross rod 38′ to the flanges of the trap door. This release door in reality forms a pivoted bottom for the compartment 15. The ends of the doors 36 and 38 are both fitted with curved wings 39 and 40, the wings being formed concentric to the shaft 17. To the release door I secure permanently a downwardly extending arm 41 positioned to one side of the rod 38′, the arrangement being such that the lower end of the said arm is given a forward or backward swinging movement in the up and down turning movement of the said gate on the rod. To the lower end of the arm I connect pivotally a bar 42′ which has the opposite end connected to a crank 42 pivotally mounted on the upper face of the door 36 at one end, the said door being provided with an angle bracket 42× which pivotally supports the crank. The free end of the crank is slotted as indicated at 43′ to receive a pin 43× extending upwardly from a latch 43 slidably carried by the gate 36. A spring 44 extends between the latch and the gate and normally acts to project the latch beyond the end of the gate and hold it engaged with a locking roller 45 suitably mounted in the end of the discharging compartment.

As before intimated the working parts are driven by a clock spring and this spring operates when released to rotate the trap door in the direction indicated by the applied arrow (Fig. 9) when the same is released by the withdrawal of the latch from the roller. In other words the latch engaging the roller locks the door against rotation. The latch is released by the animal which, after it has climbed up the escape passage and entered the discharging compartment, naturally walks on the release door 38 towards the bright end of the said compartment. As it passes outwardly on the release door its weight operates to swing the left hand end of said door (see Fig. 9) downwardly with the result that the latch is released and the instant this occurs both doors swing around together on the shaft and plunge the animal into the exterminating compartment. The clock spring and associated parts are now described in detail.

46 is a winding shaft having the ends thereof rotatably mounted in the walls of the box 22 and in the partition 21, the outer end of the shaft being squared as indicated at 46× so that the said shaft can be readily wound by the application of a socket key. To the shaft I secure permanently the inner end of a clock or winding spring 47, the other end of which is suitably anchored at 47′ to the sides of the box 22. A guard surrounds the greater part of the spring.

49 is a comparatively large gear wheel rotatably mounted on the winding shaft and 50 is a ratchet wheel permanently keyed to the winding shaft immediately to the side of the gear wheel 49. 51 and 51′ are pivotally mounted spring pressed dogs carried by the wheel 49 and positioned at opposite sides of the winding shaft and adapted to operate on the ratchet wheel, the arrangement being such that the ratchet wheel is turned by the winding spring through the dogs.

52 is a pinion meshing with the gear wheel 49 and permanently secured to the tubular shaft 18, such pinion driving the tubular shaft and consequently the doors in the compartment 15. 53 is a countershaft suitably mounted in the sides of the box 22 and provided with a pinion 54 meshed with the gear wheel 49. The forward end of the countershaft carries a cam 55 which is adjustable in respect to the shaft in order that the operation of parts associated therewith may be timed. The adjustment in the present instance is made as follows:—

56 is a disc permanently secured to the shaft and having the forward face fitted with radial ribs or teeth which are meshed with similar teeth provided on a second disc 57 rotatably mounted on the end of the countershaft. The disc 57 carries the cam and obviously by adjusting the disc 57 in respect to the disc 56 the position of the cam can be regulated. The forward end of the shaft is screw threaded and fitted with a wing nut 58. The adjustment of the cam is made by releasing the wing nut, turning the disc 57 and tightening up the nut when the cam has been brought to the proper place. The cam is rotated by the gear wheel 49 and acts through contact with parts shortly described to positively stop the rotation of the trap door after the animal has been discharged, that is to say, after the said door is rotated one complete revolution.

59 is a cross shaft rotatably mounted in one of the lower corners of the box 22 and carrying a ratchet wheel 60 permanently secured to the said shaft and a gear wheel 61 rotatably mounted on said shaft. 62 is a spring having the inner end attached to the shaft 59 and the outer end fastened to the box and 63 is a spring pressed ratchet carried by the wheel and normally engaging the ratchet wheel. With the gear wheel 61 I associate a train of gears 64 and a fly wheel 64' driven by the gear 64 all of which are adapted to spin and act as a timing brake for the shaft 59. That is to say owing to the train of gears the said shaft will turn under the action of the spring 62 for a period of time and at a comparatively slow speed.

To the front end of the shaft 59 I secure permanently a lever 65 which normally extends upwardly and passes into the path of the rotating cam, it being understood that as the cam rotates it strikes the top end of the lever and carries it around in the direction of the applied arrow for approximately a quarter of a revolution, this movement serving three functions; one, that of stopping the rotation of the trap door, another, that of winding the spring 62 and another, that of positively resetting the rocker arm 32 so that it will catch the pin 31.

To the cross shaft 59 I secure a crank 66 which is connected by a bar 67 to the lower end of a lever 68, the upper end of which is pivotally fastened at 69 to the inner side of the discharging compartment. The said lever 68 is supplied with a right angled shoulder forming a stop 70 and the said shoulder or stop is adapted to catch the trap door and stop it positively after it has rotated one revolution and the trap door is locked positively in the stopped position by the latch escaping under the roller.

To more fully understand this locking action, it is explained that the cam turns the lever 65 in the direction of the arrow (see Fig. 5) and so produces through the crank 66 and bar 67 an inward swinging movement of the lever 68, the in travel of the lever being such that the shoulder 70 is brought into the path of the turning trap door and so stops it. In the up position of the lever 65 the shoulder 70 is out and entirely free of the trap door.

As the lever 65 is rotated by the cam it acts to wind the spring 62 and as soon as the rotating cam has cleared the lever 65 the said lever is swung back to its original position by the action of the wound spring 62. This return movement, however, is not what might be termed a quick one but a timed one, the timing being brought about by the train of gears. Consequently after the stop 70 of the lever 68 has served its purpose of stopping the trap door until trap door is locked by the catch 32' it goes back out to its original position free of the trap door, this movement being effected by the spring 62 and the trap door is then held fast by the latch until it is tripped again by the down pressing of the release door 38.

The rocker arm 32 is fitted with a flat spring 71 which also passes up into the path of the cam and is designed in the rotation of the cam to positively reset the catch end of the rocker arm so that it will catch and stop the pin 31.

In order to clearly understand the working of the more recently described parts, I will now give a short description of their action.

When the animal has been caught in the trapping compartment the cranks 23 and 24 are down and the pin 31 is up, that is to say the said pin has turned freely half a revolution in the slot 30, and it is accordingly engaged with the solid part of the boss. The entrapped animal, after climbing up the escape passage into the discharge compartment, acts to swing down the release door and release the latch and the trap door then rotates a complete revolution, discharging the animal into the exterminating compartment, and afterwards becoming locked by the action of the stop 70 and the latch. As the door turns the pin 31 remains up for the first half revolution but is caught by the end of the slot 30 at the beginning of the second half revolution and is turned down to its initial reset position and at the same time the cranks are positively swung to open or reset the entrance gates. As the said pin is going down the cam is passing around and pressing the spring 71 down so that the catch 32' is positively forced up and catches the pin.

Consequently after the animal has been discharged into the exterminating compartment the trap doors are locked closed and the entrance gates are locked open. This action will continue as long as the spring 47 is energized, with the result that the trap is entirely automatic in catching the animal, exterminating it and resetting itself for a further animal and further, the caught animal is not exposed to the view of another animal entering the trap.

Figure 9:
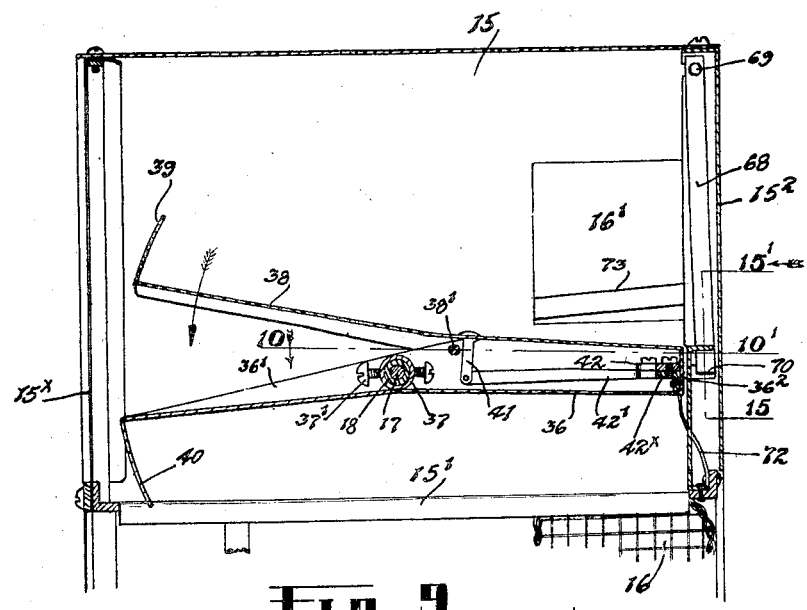
Fig. 9 is a vertical sectional view at 9—9' Fig. 4 and looking in the direction of the applied arrow.
Figures 10, 15:
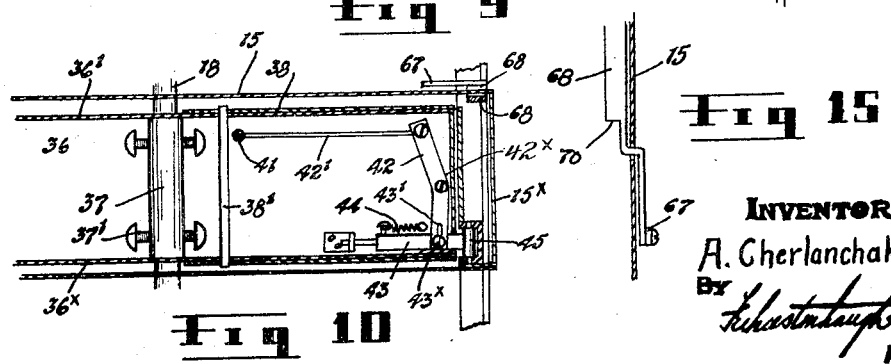
Fig. 10 is a horizontal sectional view at 10—10' Fig. 9 and looking downwardly.
Fig. 15 is a vertical sectional view at 15—15' Fig. 9 and looking inwardly.

In order to prevent the reverse or counter-clockwise rotation of the trap door, I have secured a flat spring 72 to the upper frame structure which spring extends inwardly through the end of the compartment 15 and has the inner end thereof designed to engage with the underside of the trap door at the end (see Fig. 9).

In the locking position the trap door is prevented from rotating in one direction by the latch and in the opposite direction by the spring 72. This spring is pressed out by the trap door as it rotates and after the door has been stopped by the shoulder 70 the spring springs in and takes its place beneath the same.

In the event of two animals getting caught in the trapping compartment at the same time I have provided an arrangement whereby they can both be exterminated and in this connection I might mention that in so far as the previous description is concerned it is to be borne in mind that after the trap door has rotated and discharged the animal it is positively prevented from rotating further by the pin 31 being caught by the catch and cannot turn, although the latch is released, until the catch of the rocker arm 32 has been cleared from the said pin, which movement actually occurs when the gates close. Accordingly, after one animal has been thrown into the exterminating compartment by the trap door and the door has reset the gates are also reset or opened and if a second animal went into the discharging compartment the trap door would not rotate as it is locked by the pin 31 and catch 32'. Consequently the second animal could get out by crawling down the escape passage and out through the open gates.

In order to prevent the escape of the second animal I have supplied a trip bar 73 which crosses the entrance opening between the passageway and the discharging compartment, such bar having the inner end pivoted as indicated at 74 to the side of the box 22 and normally held up by the action of a coiled spring 75 fastened to arm 76 which is attached to trip bar 73 so that the said bar will naturally have to be pressed down by the second animal in passing into the discharge compartment.

To the trip bar and within said box I secure a cross arm 76 to the front end of which I connect pivotally a downwardly extending trip arm 77 which has the lower end slidably guided in a bracket 77* and provided with a horizontally disposed foot 78 located immediately above the adjacent end of the rocker arm. From this arrangement it will be obvious that after the first animal has been caught and discharged and the second animal attempts to pass into the discharging compartment he will press down the trip bar and in so doing actuate the trip arm so that it will knock down the catch 32', release the pin 31 and free the gates to close. This not only prevents the second animal from getting out of the trap but puts the trap door in a condition such that it will operate when the second animal moves towards the bright end of the discharge compartment. The second animal will be thrown down immediately the latch is released by his weight on the release door and he will be forcibly discharged into the exterminating chamber. After he is discharged the various parts reset as hereinbefore described.

The exterminating compartment is supplied with a hinged flap 79 which is weighted as indicated at 80, the weight normally holding the flap closed and preventing the animal from crawling out of the exterminating compartment. Obviously the flap will open under the weight of the animal as it drops down from the discharging compartment.

The various boxes or compartments are provided with doors so that access can be had to the interior by the attendant but as they are simply a convenience I have not entered into a detailed description of the same.

What I claim as my invention is:—

1. A rodent trap comprising an entrance compartment having open ends, normally open gates associated with the ends of the said compartment, means actuated by the entered animal for closing the gates, an elevated discharging compartment, an escape passage connecting the compartments, a normally inert rotary power driven trap door closing the bottom of the discharging compartment, means actuated by the animal entered in the discharging compartment for releasing the trap door to rotate one revolution and discharge the animal, a receiving compartment into which the animal is expelled by the rotary action of the trap door, and means for resetting the gates in their open position coincident with the discharging of the animal from the discharging compartment.

2. A rodent trap comprising an entrance compartment having open ends, normally open gates associated with the ends of the said compartment, means actuated by the entered animal for closing the gates, an elevated discharging compartment, an escape passage connecting the compartments, a normally inert rotary power driven trap door closing the bottom of the discharging compartment, a depressible release door associated with the trap door, means actuated by the depression of the release door under the weight of the animal adapted to release the trap door to rotate and forcibly discharge the animal, means automatically stopping and locking the trap door after it has rotated one revolution, means for resetting the entrance gates in their open position during the rotary movement of the trap door and an exterminating compartment beneath the discharging compartment for receiving the discharged animal.

Signed at Winnipeg, Man., this 15th day of October, 1921.

ANDREW CHERLANCHAKEVICH.